(12) United States Patent
Swicegood (10) Patent No.: US 11,602,127 B1
(45) Date of Patent: Mar. 14, 2023

(54) SILENT AUTOMATED GAME FEEDER

(71) Applicant: Timothy G. Swicegood, Alma, KS (US)

(72) Inventor: Timothy G. Swicegood, Alma, KS (US)

( * ) Notice: Subject to any disclaimer, the term of this patent is extended or adjusted under 35 U.S.C. 154(b) by 0 days.

(21) Appl. No.: 17/752,944

(22) Filed: May 25, 2022

(51) Int. Cl.
*A01K 5/02* (2006.01)

(52) U.S. Cl.
CPC .......... *A01K 5/0225* (2013.01); *A01K 5/0291* (2013.01)

(58) Field of Classification Search
CPC ... A01K 5/0225; A01K 5/0275; A01K 5/0291
See application file for complete search history.

(56) References Cited

U.S. PATENT DOCUMENTS

| | | | | |
|---|---|---|---|---|
| 3,559,499 | A * | 2/1971 | Profet | F16H 37/12 74/89.41 |
| 3,730,142 | A * | 5/1973 | Kahrs | A01K 61/80 119/51.04 |
| 4,179,944 | A * | 12/1979 | Conner | H02K 7/06 192/141 |
| 7,178,481 | B1 * | 2/2007 | Friesenhahn, Jr. | A01K 5/0225 119/57.91 |
| 7,190,096 | B2 * | 3/2007 | Blanding | B64C 13/00 310/83 |
| 7,284,458 | B2 * | 10/2007 | Magnusson | H02K 5/26 74/25 |
| 8,096,265 | B1 | 1/2012 | Wisecarver | |
| 9,416,751 | B2 * | 8/2016 | Jones | F02K 1/763 |
| 9,655,342 | B2 * | 5/2017 | Christie | A01K 5/0225 |
| 9,700,014 | B1 | 7/2017 | Bogart | |
| 9,743,641 | B1 | 8/2017 | Attard | |
| 10,743,518 | B2 | 8/2020 | Knight | |
| 2003/0019437 | A1 | 1/2003 | Fore | |
| 2014/0174368 | A1 * | 6/2014 | Salinas | A01K 5/0291 119/51.11 |
| 2019/0390751 | A1 * | 12/2019 | Sørensen | G01B 7/003 |

FOREIGN PATENT DOCUMENTS

CA          2984165 A1 *   5/2018   ........... A01K 5/0225

* cited by examiner

*Primary Examiner* — Ebony E Evans
(74) *Attorney, Agent, or Firm* — Dale J. Ream (57) ABSTRACT

An automated game feeder that is virtually silent includes a hopper for holding feed, a bottom wall thereof defining a dispensing opening that, when open, allows feed to be dispensed. A dispensing gate is pivotally mounted to the bottom wall of the dispensing gate being operative to move, when actuated, between a closed configuration covering the dispensing opening and an open figuration allowing the feed to flow out of the hopper. A digital timer is electrically connected to the dispensing gate and programmable to determine when to open and close the dispensing gate. To maintain virtual silence, the deer feeder may include a linear actuator electrically connected to the dispensing gate and timer, the linear actuator having a servo motor that is very quiet when extending a rod configured to open or close the dispensing gate. When actuated, the linear actuator operates the gate according to an array of pivotal couplings.

14 Claims, 8 Drawing Sheets

SILENT AUTOMATED GAME FEEDER

BACKGROUND OF THE INVENTION

This invention relates generally to game feeders and, more particularly, to an automated game feeder that operates almost silently so as not to frighten away animals to be hunted.

Feeding game animals on a regular and repeated basis prior to actually hunting and harvesting the game animals, such as using a rifle or bow, is well known. The goal, of course, is for the game animals to become accustomed to finding feed at a predetermined location and on a regular basis so that the game animals are likely to approach that location even when a hunter has set up nearby for the purpose of shooting one of the animals.

One method of feeding game animals is for a hunter to throw or pour out granules onto the ground by hand or from a bucket. Another common means for feeding game animals is the so-called gravity feeder which includes a hopper or bucket that is hung or supported on legs above the predetermined feeding location and having a trapdoor which may be opened and closed regulating feed being deposited on the ground beneath the feeder. Further, some feeders include motors and controllers for automatically opening and closing the trapdoor according to predetermined time cycles. Although motorized feeders are desirable and presumably effective for their intended purposes, a major disadvantage is that the motors that open and close the hopper trapdoor are noisy and cause an unexpected and often startling noise that scares away the very game animals intended to be enticed.

Therefore, it would be desirable to have an automated deer feeder that operates to dispense feed in almost total silence. Further, it would be desirable to have an automated deer feeder that actuates a dispensing gate using a battery-powered linear actuator having a servo motor that is almost silent.

SUMMARY OF THE INVENTION

An automated game feeder that is virtually silent according to the present invention includes a hopper for holding feed suitable for deer or similar game, the hopper being configured to dispensing the feed at predetermined intervals of time and in predetermined quantities. More particularly, the hopper may be a bucket, barrel, or the like having a bottom wall and a sidewall extending upwardly from a peripheral edge of the bottom wall that, together, hold feed. The bottom wall defines a dispensing opening that, when open, allows feed to be dispensed onto the ground. The deer feeder includes a dispensing gate pivotally mounted to an exterior surface of the bottom wall the dispensing gate being operative to move, when actuated, between a closed configuration covering the dispensing opening and an open figuration allowing the feed to flow out of the hopper. The deer feeder may include a digital timer electrically connected to the dispensing gate and is programmable to determine when to open the dispensing gate, how long to leave it open, and the like.

Of critical importance to the present invention, the dispensing gate must be opened and closed quietly and as silently as possible so as not to scare away the game to be hunted, such as deer. In fact, a regular feeding schedule should be followed so that deer may be present when the feed is dispensed and, preferably, a hunter may be onsite at that very moment so as to harvest the feeding game. To this end, the deer feeder according to this invention may include a linear actuator electrically connected to the dispensing gate and timer, the linear actuator having a servo motor that is very quiet when extending a rod configured to open or close the dispensing gate.

Therefore, a general object of this invention is to provide an automated deer feeder that opens and closes a dispensing gate as quietly as possible as not to frighten away the game to be hunted.

Another object of this invention is to provide an automated deer feeder, as aforesaid, that is configured to dispense feed in predetermined quantities and at predetermined intervals of time.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale taken from FIG. 2a;

FIG. 3b is an isolated view on an enlarged scale taken from FIG. 3a;

FIG. 4b is an isolated view on an enlarged scale taken from FIG. 4a;

FIG. 5b is an isolated view on an enlarged scale taken from FIG. 5a;

FIG. 6a is a side view of the bottom wall as shown in FIG. 4a;

FIG. 6b is a sectional view taken along line 6b-6b of FIG. 6a;

FIG. 7a is a side view of the bottom wall as shown in FIG. 4a;

FIG. 7b is a sectional view taken along line 7b-7b of FIG. 7a; and

DESCRIPTION OF THE PREFERRED EMBODIMENT

A silent automated game feeder according to a preferred embodiment of the present invention will now be described with reference to FIG. 1a to 7c of the accompanying drawings.

The automated game feeder 10 includes a container that may be filled and refilled with feed suitable for an animal being hunted, the feed container being referred to herein as a hopper 11. In a preferred embodiment of the invention being described herein, the feed included in the hopper 11 is suitable for deer or the like. Hunters are well aware that dispensing suitable feed upon the ground is advantageous not only to sustain a deer population in times when food is otherwise scarce, e.g., the wintertime, but also to lure desired game into a predetermined location to be harvested via hunting, such as with a rifle or bow.

In an embodiment, therefore, the hopper 11 may include a bottom wall 12 and at least one sidewall 14 extending upwardly from a peripheral edge of the bottom wall 12. For instance, the hopper 11 may be a bucket or barrel having a cylindrical configuration and continuous sidewall although a hopper 11 having a cubicle, rectangular, or spherical configuration is also contemplated. Together, the bottom and side walls define an interior area suitable for receiving and containing a quantity of feed whether it be granular, powder, or the like. Preferably, the sidewall 14 extends downwardly beyond the peripheral edge of the bottom wall 12 such that the bottom wall is effectively recessed and protected from rain and other weather events. As will be discussed later, is this so-called sidewall lip protects the linear actuator 30 from rain.

In some embodiments, the side wall 14 may include an upper peripheral edge that defines an open top through which the interior area may be accessed such as to replenish a quantity of feed. Further, the hopper 11 may include a lid 16 selectively attached and positioned atop the open top, the lid 16 being removable for accessing the interior area or secured so as to block or prevent access to the interior area.

Preferably, the bottom wall 12 defines a dispensing opening 18 having a dimension and configuration suitable for allowing feed to be dispensed from storage in the interior area of the hopper 11, such as to dispense the feed onto the ground. In an embodiment, the automated deer feeder 10 includes a dispensing gate 20 pivotally mounted to an exterior surface of the bottom wall 12, the dispensing gate 20 being movable about its pivotal coupling. More particularly, the pivotal coupling may include a pin, bolt, or similar fastener about which the dispensing gate 20 may swivel, rotate, or otherwise pivot. For the sake of clarity, the dispensing opening 18 may be viewed as being parallel or in the same horizontal plane as the bottom wall 12 whereas the pivotal coupling of the dispensing gate 20 may be viewed as defining an imaginary vertical axis that extends away from the dispensing gate 20 and is perpendicular thereto.

In its broadest understanding, the automated deer feeder 10 according to the present invention may include a linear actuator 30 mounted to the exterior surface of the bottom wall 12 adjacent the dispensing opening 18 and operatively coupled to the dispensing gate 20 such that the dispensing gate 20 is movable between a closed configuration completely covering the dispensing opening 18 (so as to prevent feed from being dispensed) and an open configuration displaced from and not covering the dispensing opening 18 (so as to dispense feed). It is understood that the linear actuator 30 is configured to move the dispensing gate 20 between open and closed configurations when electrically actuated. The linear actuator 30 is electrically driven and capable of moving the dispensing gate 20 very quietly and for reasons that will be discussed later in more detail.

In another aspect, the automated deer feeder 10 may include a digital timer 40 that is electrically connected to the linear actuator 30 and is operative, such as via programming or electrical circuitry, to actuate the linear actuator 30 to open and close the dispensing gate 20, respectively. The digital timer 40 may include input buttons or other means for programming or configuration by a user. For instance, the digital timer 40 may be configured for dispensing feed at predetermined times of a day or night, for opening the dispensing gate 20 for a predetermined amount of time, or the like.

Described now in detail, the linear actuator 30 may include a servo motor 30a that is powered by its electrical connection to a battery, both of which may be situated inside a casing 32. Further, the linear actuator 30 may include a mechanical linkage, such as a lead screw 30b or geartrain, that operatively connects the servo motor 30a to an actuator rod 34. The actuator rod 34 may include a proximal end coupled to the linkage and include a distal end 34a such that the actuator rod 34 is movable between a normally retracted configuration positioned substantially inside the casing 32 and an extended configuration positioned substantially outside of the casing 32. In other words, the actuator rod 34 is movable in and out as the servo motor is energized in either a reverse or forward mode, respectively. It is understood that a battery-operated servo motor is very quiet and, in the presence and context of nature sounds (such as wind, rustling leaves, bird sounds, etc.), operation of the linear actuator 30 is virtually silent.

Before describing a series of pivotal movements characteristic of opening or closing the dispensing gate 20, a preferred embodiment of the dispensing gate 20 will be described. Namely, the dispensing gate 20 may include an L-shaped configuration that includes the covering portion 22 having a generally planar shape configuration that is parallel to the bottom wall 12 of the hopper 11 and dimensioned to cover the dispensing opening 18. Further, the dispensing gate 20 may include a positioning portion 24 that may be perpendicular to and extending away from the covering portion 22. Preferably, it is the positioning portion 24 of the dispensing gate 20 that is pivotally coupled to the second portion 36b of the interface member 36 as described below.

In an embodiment, the actuation rod 34 of the linear actuator 30 includes an interface member 36 (also referred to as a first interface member) that is situated intermediate the distal end 34a of the actuator rod 34 and the dispensing gate 20, the interface member 36 being pivotally movable in two geometric planes. In an embodiment, the interface member 36 may be a clevis, a.k.a. a clevis bracket. More particularly, the first interface member 36 may include a first portion 36a that is pivotally coupled to the distal end 34a of the actuator rod 34 and a second portion 36b that is pivotally coupled to the positioning portion 24 of the dispensing gate 20. Geometrically, the pivotal coupling associated with the first portion 36a defines a first axis of rotation and the pivotal coupling associated with the second portion 36b defines a second axis of rotation. The movement of the actuator rod 34, double pivotal movement of the interface member 36, and swivel movement of the dispensing gate 20 is best understood by comparing FIGS. 3b and 4b.

Figures 1A, 1B:
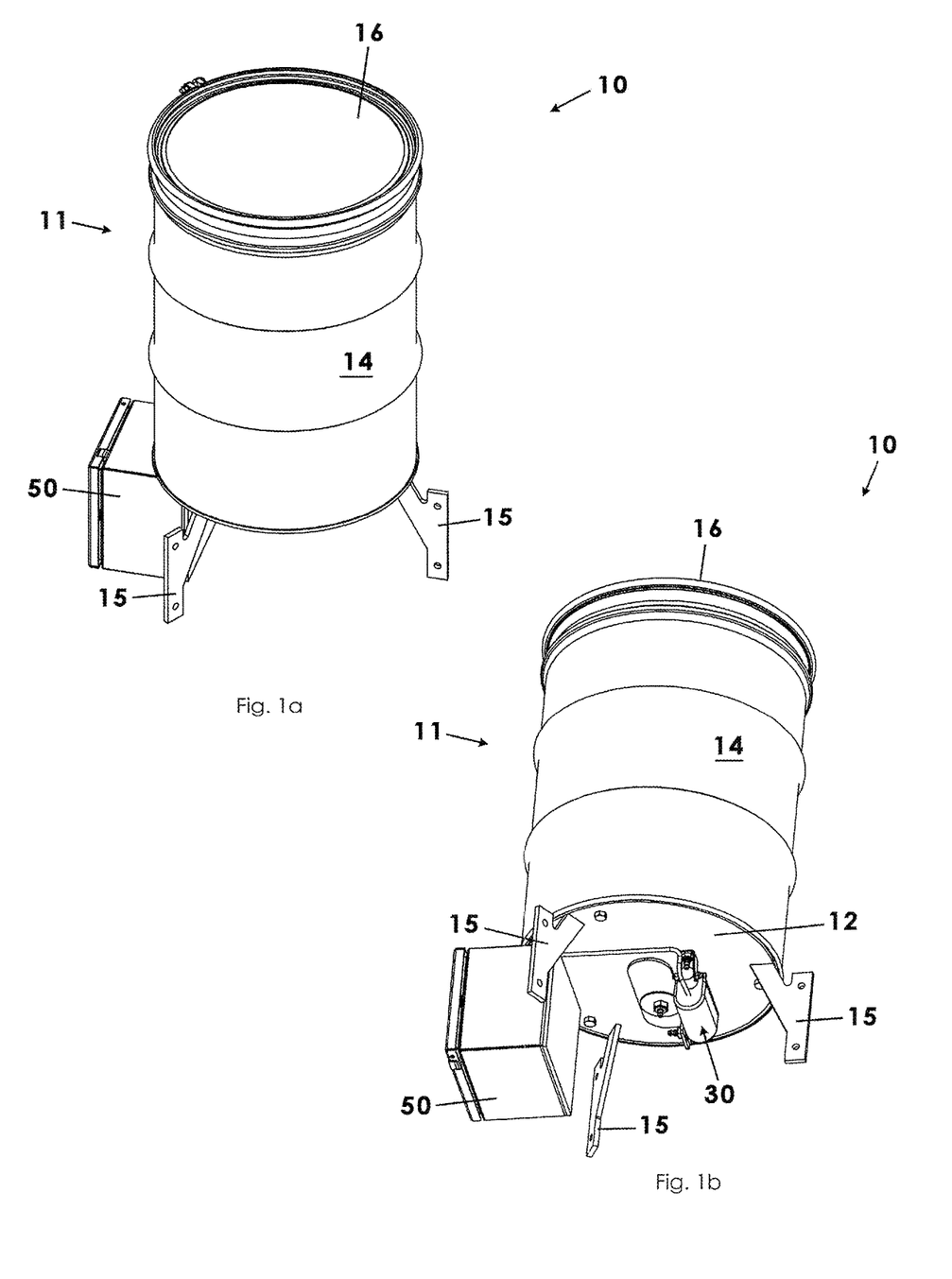
FIG. 1a is a perspective view of the automated deer feeder according to a preferred embodiment of the present invention.
FIG. 1b is a perspective view of the automated deer feeder as in FIG. 1a taken from a lower angle and illustrated with the dispensing gate in a closed configuration.
Figure 2A:
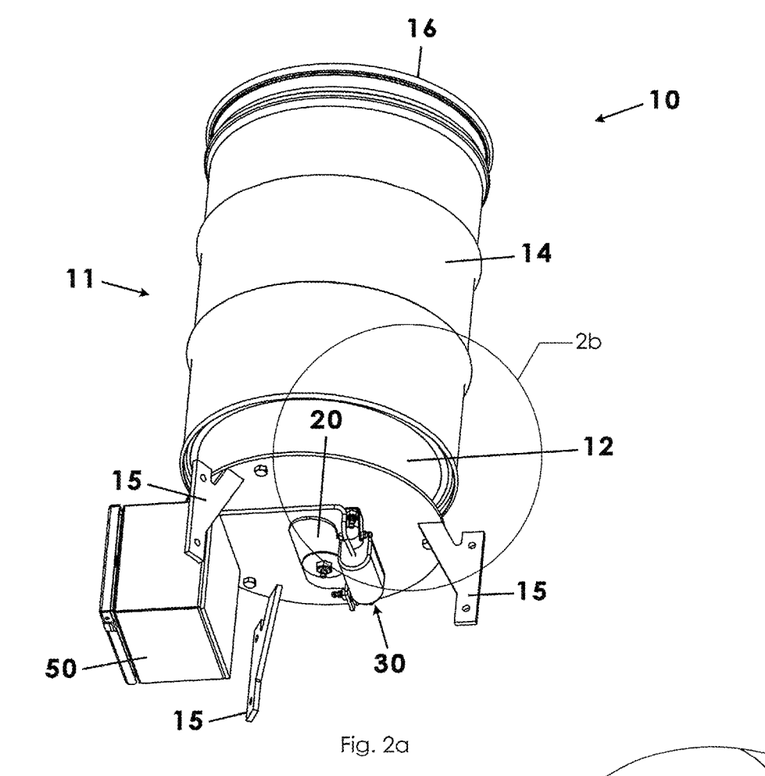
FIG. 2a is a partially exploded view of the automated deer feeder as in FIG. 1b, illustrated with the dispensing gate in an open configuration.
Figure 2B:
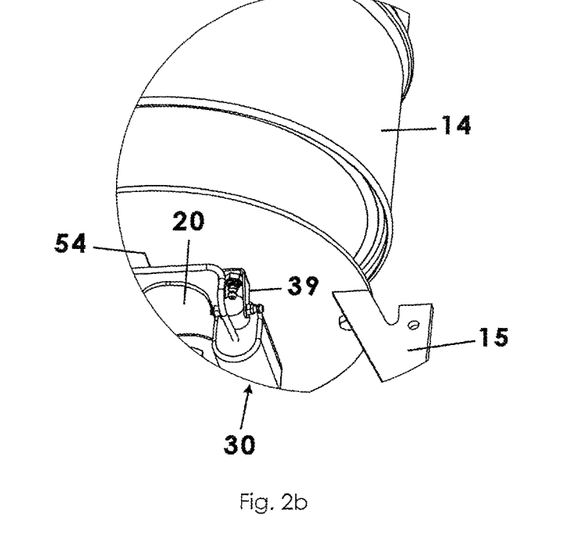
Figure 3A:
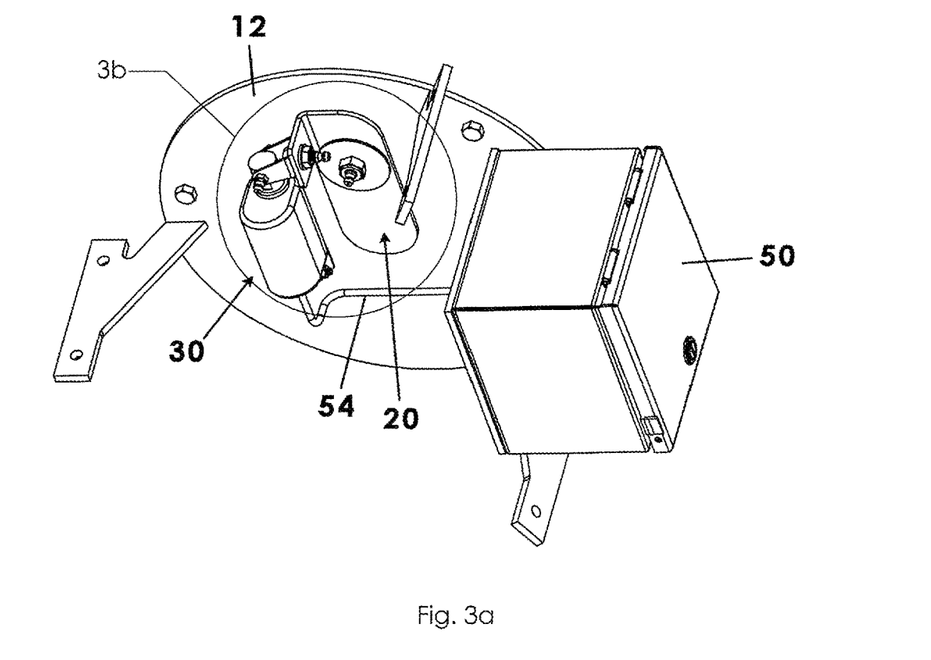
FIG. 3a is an isolated perspective view of the bottom wall removed from the hopper as in FIG. 1b, illustrated with the dispensing gate in a closed configuration.
Figure 3B:
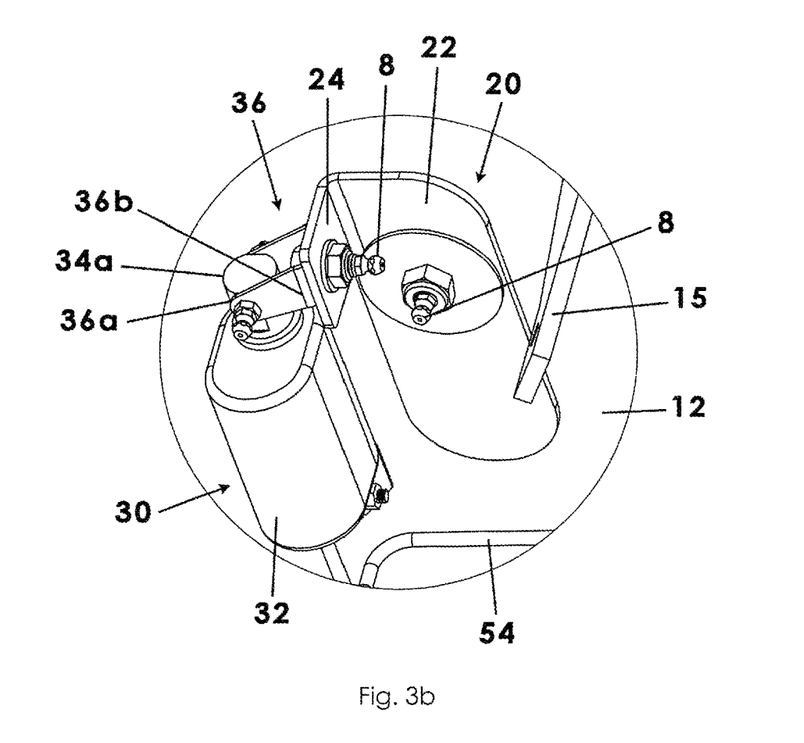
Figure 4A:
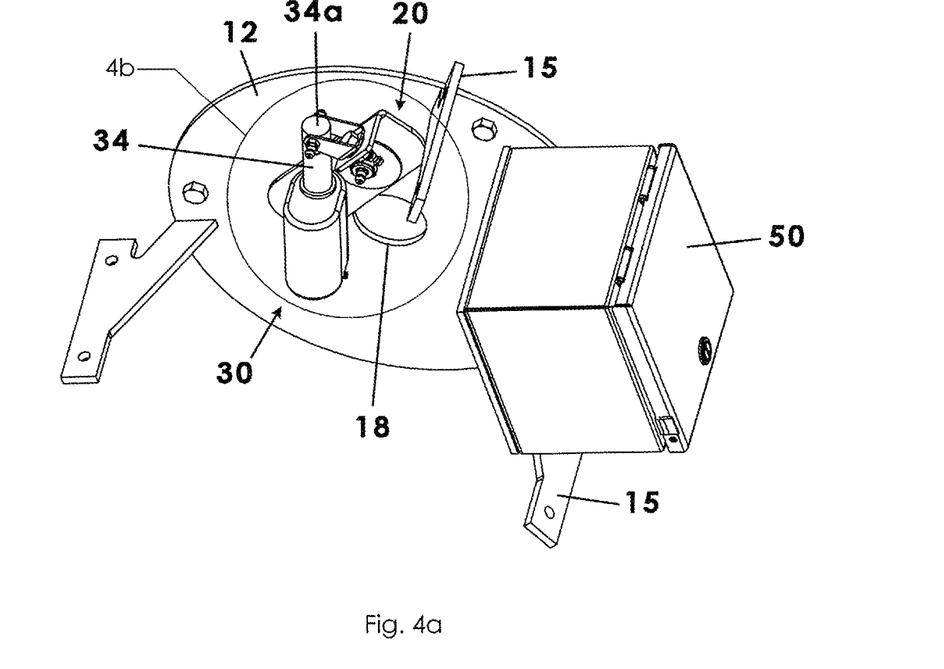
FIG. 4a is an isolated perspective view of the bottom wall removed from the hopper as in FIG. 1b, illustrated with the dispensing gate in an open configuration.
Figure 4B:
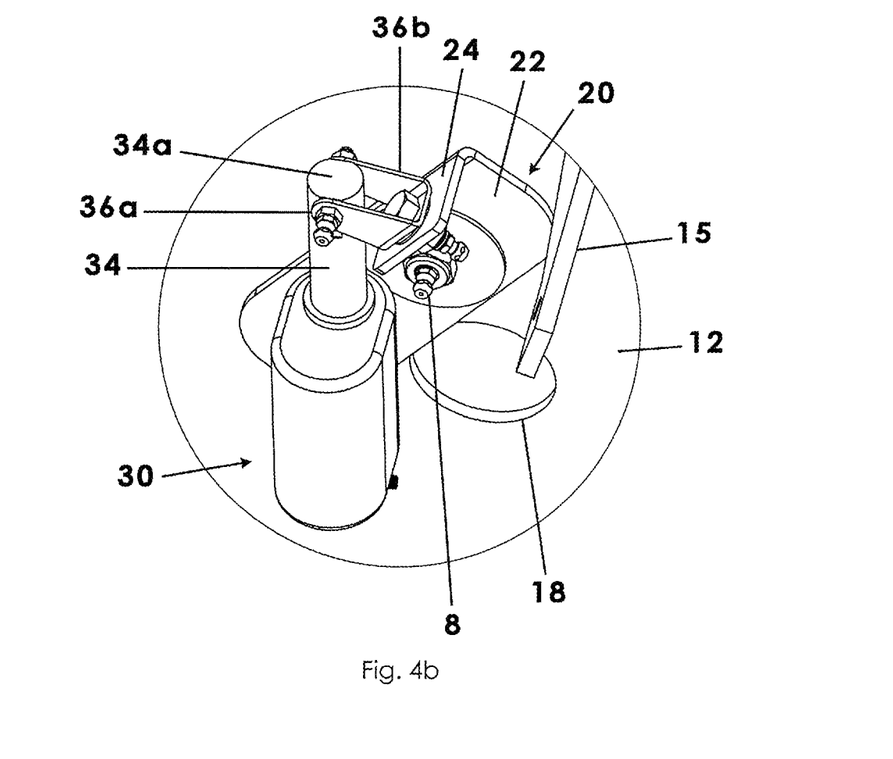
Figure 7A:
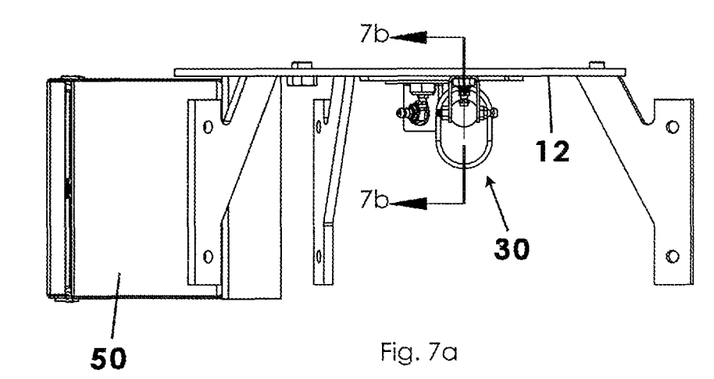
Figure 7B:
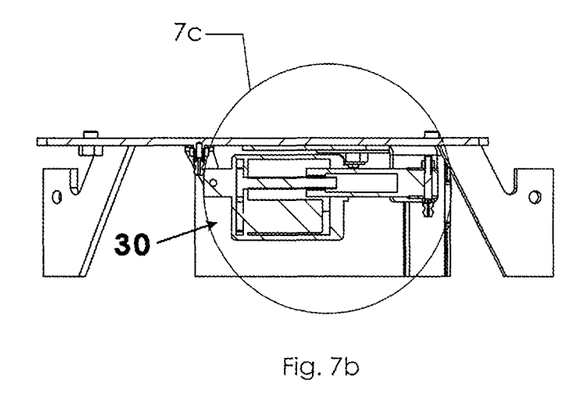
Figure 7C:
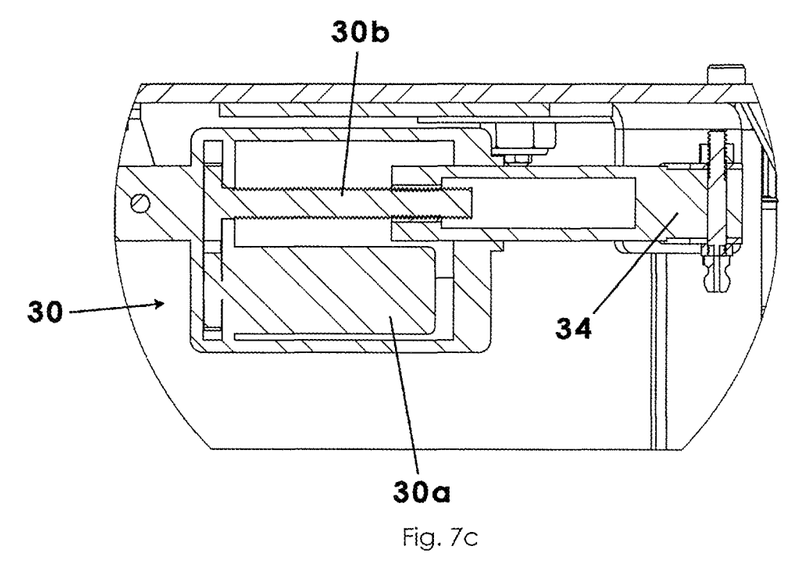
FIG. 7c is an isolated view on an enlarged scale taken from FIG. 7b.

Referring to FIG. 3b, the covering portion 22 is positioned covering or blocking the dispensing opening 18 and the actuator rod 34 is in the retracted configuration. Then, when the linear actuator 30 is energized as described above, the actuator rod 34 is moved linearly toward the extended configuration which causes the interface member 36 to pivot in two planes and which causes the dispensing gate 20 to swivel to the open configuration, i.e., to pivot about its pivotal coupling to the bottom wall 12 and the vertical axis defined thereby. It is understood that energizing the servo motor of the linear actuator 30 will reverse each of the pivotal couplings described above so as to return the dispensing gate 20 to its closed or covered configuration. It is also understood that operation of the linear actuator 30 in one direction causes clockwise rotational movements whereas operation in a reverse direction causes counter-clockwise rotational movements along the pivot axes described above. Further, each pivotal coupling may include an independently accessible grease fitting 8 enabling a user to properly service the moving parts of the invention. Generally, operation of a linear actuator 30 is well known in the art of moving an object back and forth, i.e., between retracted and extended configurations. This movement is accomplished by a motor 30a electrically activating a lead screw 30b to threadably push or pull an actuator rod 34. Although being well understood, operation of a linear actuator 30, including a motor 30a, lead screw 30b, and actuator rod 34 is shown first in a retracted configuration (FIG. 6c) and then, when electrically activated, in an extended configuration (FIG. 7c).

In another aspect, the casing 32 may itself be pivotally coupled to the exterior surface of the bottom wall 12 such as with a second interface member 39 so the casing 32 is movable when the linear actuator 30 is energized. Again, the second interface member 39 may be a clevis bracket and may be doubly pivotable with regard to the bottom wall 12 and a mounting portion 33 of the casing 32, respectively.

Figure 5A:
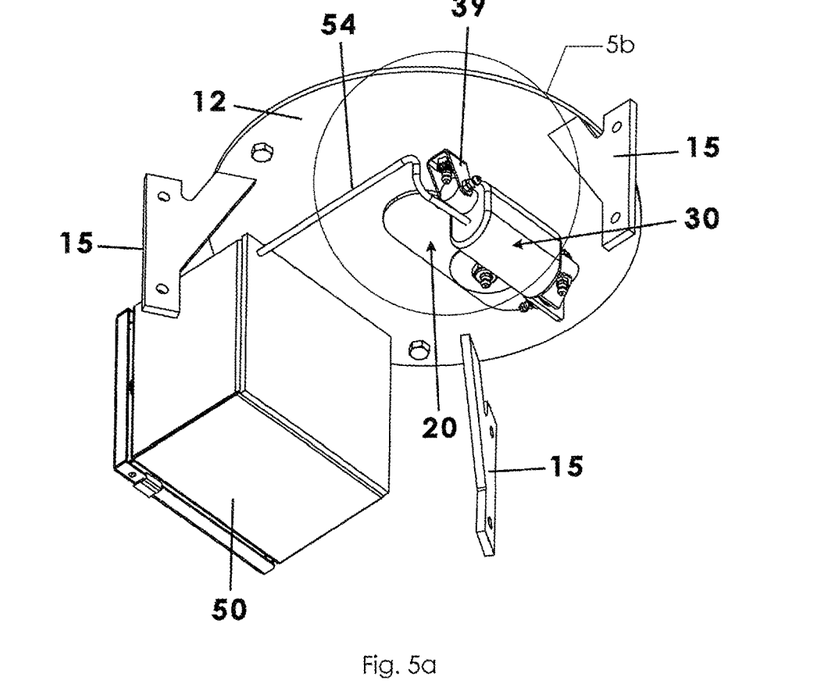
FIG. 5a is a perspective view taken from a rear angle so as to illustrate a mounting of the linear actuator.
Figure 5B:
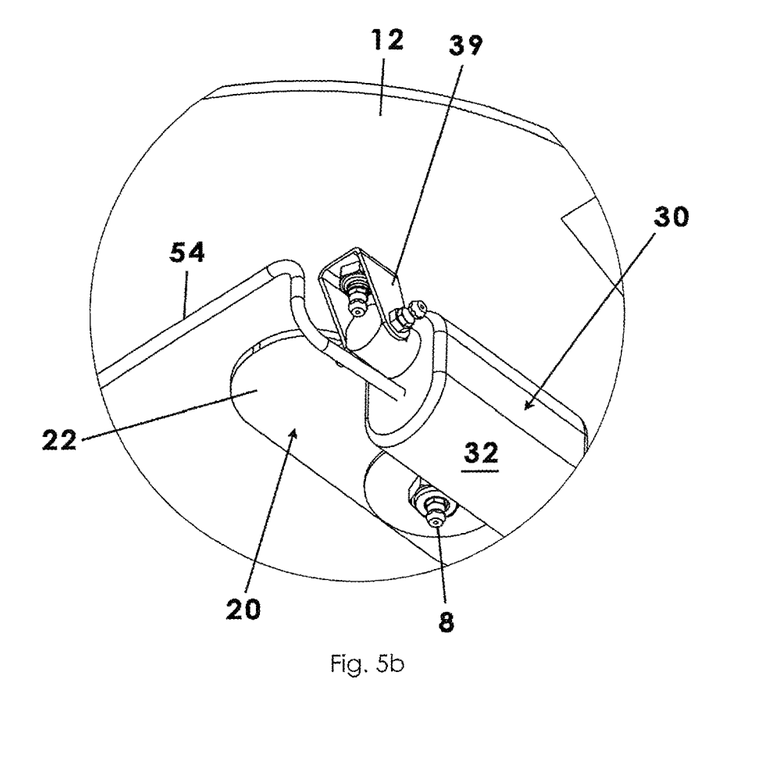
Figure 6:
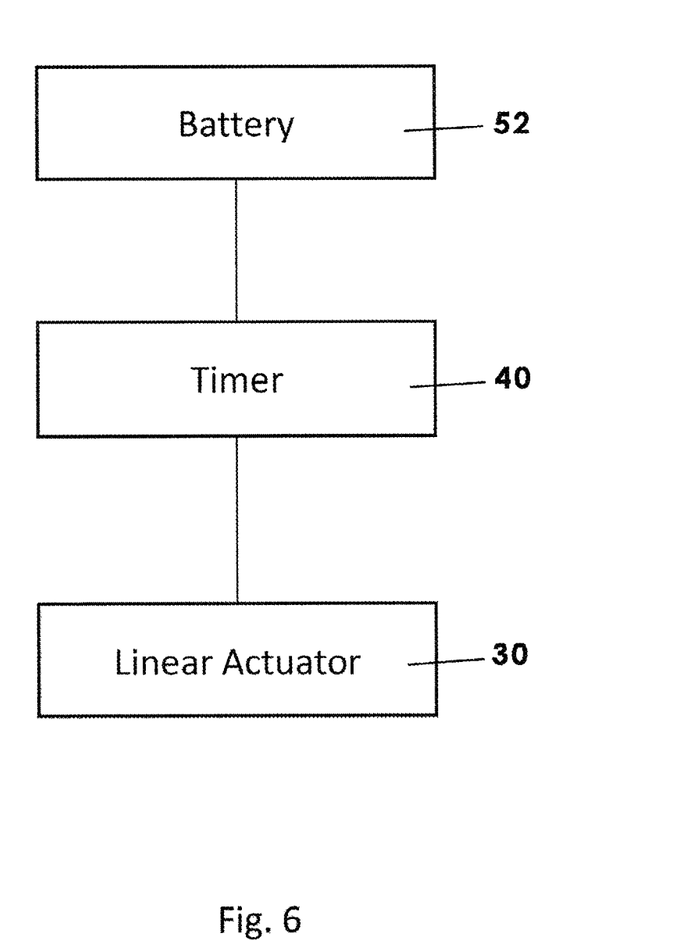
FIG. 6 is a block diagram illustrating the electric components according to the present invention
Figure 6A:
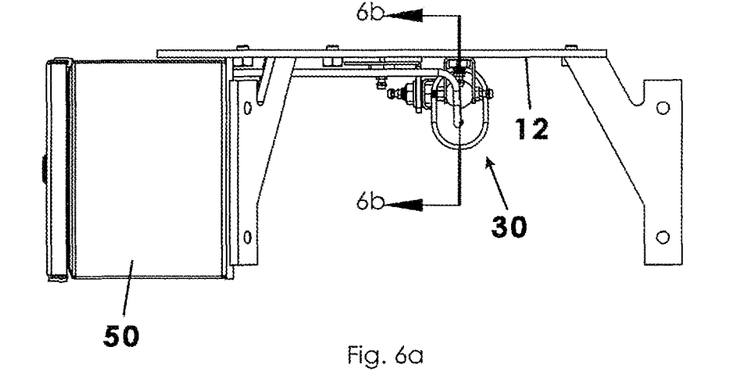
Figure 6B:
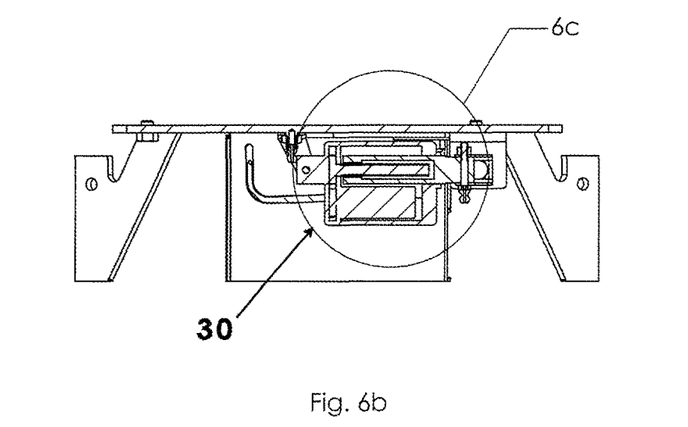
Figure 6C:
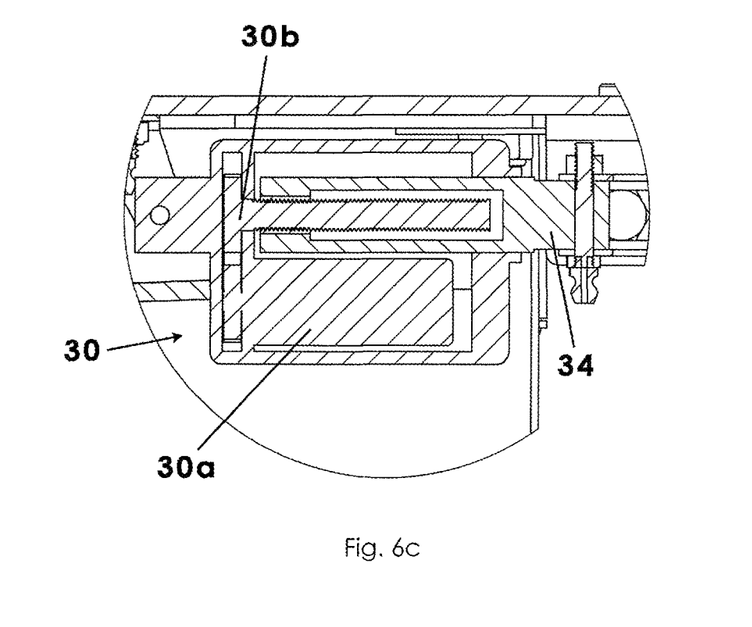
FIG. 6c is an isolated view on an enlarged scale taken from FIG. 6b.

In an embodiment, the hopper 12 may include a plurality of stabilizer legs 15 spaced apart from one another, each stabilizer leg depending from and extending away from the bottom wall 12. The plurality of stabilizer legs 15 are configured for supporting the hopper 11 upon a ground surface, such as when the hopper is being refilled. Preferably, of course, the game feeder is intended to be raised and suspended above a ground surface such that feed is dumped from the hopper from a raised configuration. The legs 15 protect the electronics box 50 from being crushed or impacted when the hopper 12 is lowered and supported on the ground, In an embodiment, electronic components of the present invention may be housed in an electronics box 50 that is coupled to the bottom wall 12 as shown throughout the illustrations. The electronics box 50 may have walls and a lid and defines an open interior area for receiving a battery 52 which is electrically connected to the digital timer 40. The battery 52 and timer 40 may be electrically connected to the linear actuator 30 V a conventional electrical power cord 54 as shown in FIG. 5a. It is understood that the digital timer 40 may be programmed at the factory or, in an embodiment, by the user using input buttons, and analog dial, or other input means, whereby to predetermined when the linear actuator 30 will be energized to open and close the dispensing gate 20. It is understood that the legs 15

It is understood that while certain forms of this invention have been illustrated and described, it is not limited thereto except insofar as such limitations are included in the following claims and allowable functional equivalents thereof.

The invention claimed is:

1. A silent automated game feeder, comprising:
   a hopper having a bottom wall and a sidewall extending upwardly from a peripheral edge of said bottom wall such that said bottom wall and said sidewall, together, define an interior area, said bottom wall defining a dispensing opening;
   a dispensing gate mounted to an exterior surface of said bottom wall that is operative to move between a closed configuration covering said dispensing opening and an open figuration adjacent said dispensing opening;
   a linear actuator coupled to said dispensing gate and operative, when electrically actuated, to move said dispensing gate between said closed and said open configurations;
   a digital timer electrically connected to said linear actuator that is programmable to electrically actuate said linear actuator to move said dispensing gate at programmable intervals;
   wherein said linear actuator includes:
      a casing;
      a servo motor situated in said casing and electrically connected to a battery;
      a mechanical linkage situated in the casing and operatively coupled to said servo motor;
      an actuator rod having a proximal end coupled to said mechanical linkage and having a distal end opposite said proximal end, said actuator rod being movable, when said servo motor is actuated, between a retracted configuration substantially inside the casing and an extended configuration substantially outside the casing;
      a first interface member positioned intermediate said distal end of said actuator rod and said dispensing gate
   wherein:
      a first portion of said first interface member is pivotally coupled to said distal end of said actuator rod so as to define a first axis of rotation;
      a second portion of said first interface member is pivotally coupled to said dispensing gate so as to define a second axis of rotation; and
      said dispensing gate is pivotally coupled to said bottom wall of said hopper so as to define an imaginary vertical axis that is parallel to said sidewall of said hopper.

2. The silent automated game feeder as in claim 1, wherein a second actuation of said servo motor causes said actuator rod to move linearly toward said retracted configuration which causes said first and second portions of said first interface member to pivot in a counter-clockwise direction about said first and second axis of rotation, respectively, such that said dispensing gate is swiveled about said imaginary vertical axis toward said closed configuration.

3. The silent automated game feeder as in claim 1, wherein each pivotal coupling includes an independently accessible grease fitting.

4. The silent automated game feeder as in claim 1, further comprising an electronics box operatively coupled to said hopper and defining an interior area for holding said battery and said digital timer, said battery and said digital timer being electrically connected to said linear actuator.

5. The silent automated game feeder as in claim 4, further comprising:
   a plurality of stabilizer legs mounted to said bottom wall of said hopper spaced apart from one another for supporting said hopper upon a ground surface;
   wherein said sidewall of said hopper extends downwardly beyond said peripheral edge of said bottom wall such that said bottom wall is inset and shielded from weather elements.

6. A silent automated game feeder, comprising:
   a hopper having a bottom wall and a sidewall extending upwardly from a peripheral edge of said bottom wall such that said bottom wall and said sidewall, together, define an interior area, said bottom wall defining a dispensing opening;
a dispensing gate mounted to an exterior surface of said bottom wall that is operative to move between a closed configuration covering said dispensing opening and an open figuration adjacent said dispensing opening;
a linear actuator coupled to said dispensing gate and operative, when electrically actuated, to move said dispensing gate between said closed and said open configurations;
a digital timer electrically connected to said linear actuator that is programmable to electrically actuate said linear actuator to move said dispensing gate at programmable intervals;
wherein said linear actuator includes:
a casing;
a servo motor situated in said casing and electrically connected to a battery;
a mechanical linkage situated in the casing and operatively coupled to said servo motor;
an actuator rod having a proximal end coupled to said mechanical linkage and having a distal end opposite said proximal end, said actuator rod being movable, when said servo motor is actuated, between a retracted configuration substantially inside the casing and an extended configuration substantially outside the casing;
wherein said linear actuator includes a first interface member positioned intermediate said distal end of said actuator rod and said dispensing gate;
wherein said casing includes a second interface member pivotally coupled to said exterior surface of said bottom wall adjacent said dispensing opening so that said casing is movable rotationally when said dispensing gate is swiveled between said open and closed configurations.

7. A silent automated game feeder, comprising:
a hopper having a bottom wall and a sidewall extending upwardly from a peripheral edge of said bottom wall such that said bottom wall and said sidewall, together, define an interior area for holding feed, said bottom wall defining a dispensing opening,
said sidewall of said hopper extends downwardly beyond said peripheral edge of said sidewall such that said bottom wall is inset and shielded from weather elements;
a dispensing gate pivotally mounted to an exterior surface of said bottom wall so as to define an imaginary vertical axis, said dispensing gate being operative to move, when actuated, between a closed configuration covering said dispensing opening and an open figuration allowing the feed to flow out of the interior area;
a linear actuator coupled to said dispensing gate and operative, when electrically actuated, to move said dispensing gate between said closed and said open configurations;
a digital timer electrically connected to said linear actuator that is programmable to electrically actuate said linear actuator to move said dispensing gate at programmable intervals;
wherein said dispensing gate has an L-shaped configuration that includes a covering portion having a planar configuration that is parallel to said bottom wall of said hopper so as to cover said dispensing opening at said closed configuration and a positioning portion extending away from said covering portion and operatively coupled to said linear actuator.

8. The silent automated game feeder as in claim 7, wherein said sidewall includes an upper peripheral edge that defines an open top, said hopper including a lid that is movable between an open configuration allowing the feed to be deposited into said interior area and a closed configuration in enclosing said open top.

9. The silent automated game feeder as in claim 7, wherein said linear actuator includes:
a casing defining an interior space and an outlet opening;
a servo motor situated in said interior space of said casing and electrically connected to a battery;
a mechanical linkage situated in the interior area of said casing that is operatively coupled to said servo motor;
an actuator rod having a proximal end coupled to said mechanical linkage and having a distal end opposite said proximal end, said actuator rod being movable, when said servo motor is actuated, between a retracted configuration substantially inside the casing and an extended configuration protruding outside the casing via said outlet opening;
a first interface member positioned intermediate said distal end of said actuator rod and said dispensing gate, said first interface member having a first portion pivotally coupled to said distal end of said actuator rod and having a second portion pivotally coupled to said positioning portion of said dispensing gate.

10. The silent automated game feeder as in claim 9, wherein said first interface member is a clevis that is configured to pivot in two geometric planes relative to said positioning portion of said dispensing gate when said actuator rod is actuated.

11. The silent automated game feeder as in claim 10, wherein a first actuation of said servo motor causes said actuator rod to move linearly toward said extended configuration which causes said first and second portions of said first interface member to pivot in a clockwise direction such that said dispensing gate is swiveled about said imaginary vertical axis and moved toward said open configuration.

12. The silent automated game feeder as in claim 11, wherein a second actuation of said servo motor causes said actuator rod to move linearly toward said retracted configuration which causes said first and second portions of said first interface member to pivot in a counter-clockwise direction such that said dispensing gate is swiveled about said imaginary vertical axis and moved toward said closed configuration.

13. The silent automated game feeder as in claim 9, wherein said casing is pivotally coupled to said exterior surface of said bottom wall via a second interface member so that said casing is movable when said dispensing gate is swiveled between said open and closed configurations.

14. The silent automated game feeder as in claim 7, further comprising a plurality of stabilizer legs mounted to said bottom wall of said hopper spaced apart from one another for supporting said hopper upon a ground surface.

* * * * *